United States Patent
Ishizaka et al.

(10) Patent No.: US 10,084,618 B2
(45) Date of Patent: Sep. 25, 2018

(54) PROCESSING CIRCUIT AND SIGNAL CORRECTION METHOD

(71) Applicant: MITSUBISHI ELECTRIC CORPORATION, Chiyoda-ku, Tokyo (JP)

(72) Inventors: Satoru Ishizaka, Tokyo (JP); Yoshiyuki Kusano, Tokyo (JP); Takahiro Ito, Tokyo (JP); Yoshimitsu Tawarayama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 141 days.

(21) Appl. No.: 15/111,645

(22) PCT Filed: Mar. 20, 2014

(86) PCT No.: PCT/JP2014/057684
§ 371 (c)(1),
(2) Date: Jul. 14, 2016

(87) PCT Pub. No.: WO2015/140976
PCT Pub. Date: Sep. 24, 2015

(65) Prior Publication Data
US 2017/0005837 A1 Jan. 5, 2017

(51) Int. Cl.
*H04B 1/62* (2006.01)
*H04L 25/03* (2006.01)
(Continued)

(52) U.S. Cl.
CPC .............. *H04L 25/03* (2013.01); *H04B 3/04* (2013.01); *H04L 25/0292* (2013.01)

(58) Field of Classification Search
CPC ....... H03F 1/3282; H04B 1/0475; H04B 1/62; H04L 27/366; H04L 27/367; H04L 27/368
(Continued)

(56) References Cited

U.S. PATENT DOCUMENTS 3,778,722 A * 12/1973 Stein .................... H03H 11/126
375/346
7,190,188 B2 3/2007 Otsuka et al.
(Continued)

FOREIGN PATENT DOCUMENTS

JP 05-315998 A 11/1993
JP 11-121099 A 4/1999
(Continued)

OTHER PUBLICATIONS

International Search Report (PCT/ISA/210) dated Jun. 24, 2014, by the Japanese Patent Office as the International Searching Authority for International Application No. PCT/JP2014/057684.
(Continued)

*Primary Examiner* — Kevin Kim
(74) *Attorney, Agent, or Firm* — Buchanan Ingersoll & Rooney PC (57) ABSTRACT

A transmission circuit, mounted on a printed board and having attenuation characteristics, to attenuate an amplitude of a reception signal according to the attenuation characteristics, and to transmit the amplitude-attenuated reception signal, as an attenuation signal; and a correction circuit, mounted on the printed board and having correction characteristics, to attenuate an attenuation signal that has been received from the transmission circuit according to the correction characteristics, and to transmit the attenuation signal attenuated, as a correction signal are provided. The attenuation characteristics are such characteristics that the
(Continued)

ratio of the amplitude of the attenuation signal to the amplitude of the reception signal decreases as the frequency of the reception signal increases. The correction characteristics are characteristics with which the ratio of the amplitude of the correction signal to the amplitude of the attenuation signal increases as the frequency of the attenuation signal increases.

15 Claims, 7 Drawing Sheets

(51) Int. Cl.
   *H04B 3/04* (2006.01)
   *H04L 25/02* (2006.01)

(58) Field of Classification Search
   USPC ....................................................... 375/296
   See application file for complete search history.

(56) References Cited

U.S. PATENT DOCUMENTS 7,321,661 B2 * 1/2008 Stanley .................... H04R 3/14
   381/111
   7,505,520 B2    3/2009 Kudoh
   2003/0128767 A1    7/2003 Kudoh
   2004/0120419 A1 * 6/2004 Gauthier ................ H04B 3/542
   375/285
   2005/0040846 A1    2/2005 Otsuka et al.
   2014/0254602 A1 * 9/2014 Lindorfer ............ H04B 5/0012
   370/401

FOREIGN PATENT DOCUMENTS

| JP | 2003-204291 A | 7/2003 |
   | JP | 2004-350312 A | 12/2004 |
   | JP | 2005-051496 A | 2/2005 |
   | JP | 2007-174468 A | 7/2007 |
   | JP | 2009-055284 A | 3/2009 |
   | JP | 2009-259922 A | 11/2009 |

OTHER PUBLICATIONS

Office Action dated Mar. 14, 2017, by the Japanese Patent Office in corresponding Japanese Patent Application No. 2016-508410 and partial English translation of the Office Action. (5 pages).

* cited by examiner

PROCESSING CIRCUIT AND SIGNAL CORRECTION METHOD

TECHNICAL FIELD

The present invention relates to a processing circuit which processes a high-frequency signal at a high speed, and a signal correction method of this processing circuit.

BACKGROUND ART

In electrical and electronic equipment, the electrical performance requirements for executing high-speed signal transmission correctly are that the frequency attenuation characteristics of a transmission channel existing between a driver and a receiver, both being an LSI (Large Scale Integration), are flat over a wide range.

To satisfy such electrical performance requirements, conventionally, the transmission channel in the electrical and electronic equipment is formed, for example, by using a high-class substrate material having a low dielectric constant, by using a connector for high-frequency transmission, and by accurate board design.

In recent years, designing for reproducing a signal waveform in a receiver finally appearing as a rectangular wave, by using an equalizer function of performing wave shaping and an automatic gain amplification function, of an LSI is becoming popular.

Particularly, when amplifying a high-frequency-range signal having a large SN ratio (signal/noise ratio) and a large attenuation amount, an equalizer that implements the equalizer function is required to have a capability of performing linear correction, so that the frequency amplitude characteristics of the amplified high-frequency signal are flat over a wide range. Hence, the LSI analog equalizer needs to have frequency characteristics that cover the high-frequency range as well. As a result, undesirably, for example, the crosstalk noise may increase and the circuit scale may increase.

A technique is also disclosed (for example, see Patent Literature 1) which flattens the frequency amplitude characteristics by disposing a directional coupler called filter in a transmission channel between a driver and a receiver.

CITATION LIST

Patent Literature

Patent Literature 1: JP 2009-259922

SUMMARY OF INVENTION

Technical Problem

As described above, when an LSI analog equalizer is used, problems arise such as an increase in crosstalk and an increase in circuit scale.

The directional coupler according to the technique of Patent Literature 1 has problems that it does not have a capability of correcting the frequency characteristics effectively and that the circuit configuration becomes complicated.

The present invention has been made to solve these problems, and has as its objective to provide a high-speed circuit that can decrease crosstalk noise and reduce the circuit scale with a simple configuration.

Solution to Problem

A processing circuit mounted on a printed board includes:
a transmission circuit, mounted on the printed board and having first attenuation characteristics of attenuating an amplitude of a reception signal that has been received, to send out the reception signal that has been attenuated according to the first attenuation characteristics, as an attenuation signal; and
a correction circuit, mounted on the printed board and having second attenuation characteristics of attenuating the attenuation signal that has been received from the transmission circuit, to transmit the attenuation signal that has been attenuated according to the second attenuation characteristics, as a correction signal,
the first attenuation characteristics of the transmission circuit being characteristics with which a ratio of an amplitude of the attenuation signal to an amplitude of the reception signal decreases as a frequency of the reception signal increases,
the second attenuation characteristics of the correction circuit being characteristics with which a ratio of an amplitude of the correction signal to an amplitude of the attenuation signal increases as a frequency of the attenuation signal increases.

Advantageous Effects of Invention

With a processing circuit according to the present invention, a transmission circuit attenuates the amplitude of a reception signal, and sends out the amplitude-attenuated reception signal, as an attenuation signal. The amplitude of the reception signal is attenuated according to the first attenuation characteristics with which the ratio of the amplitude of the attenuation signal to the amplitude of the reception signal decreases as the frequency of the reception signal increases. A correction circuit attenuates the attenuation signal, and transmits the attenuation signal that has been attenuated, as a correction signal. The attenuation signal is attenuated according to the second attenuation characteristics with which the ratio of the amplitude of the correction signal to the amplitude of the attenuation signal increases as the frequency of the attenuation signal increases. Therefore, as with an analog equalizer, an effect of flattening the frequency amplitude characteristics can be obtained, the crosstalk is decreased, and the circuit scale is reduced.

DESCRIPTION OF EMBODIMENTS

Embodiment 1

Figure 1:
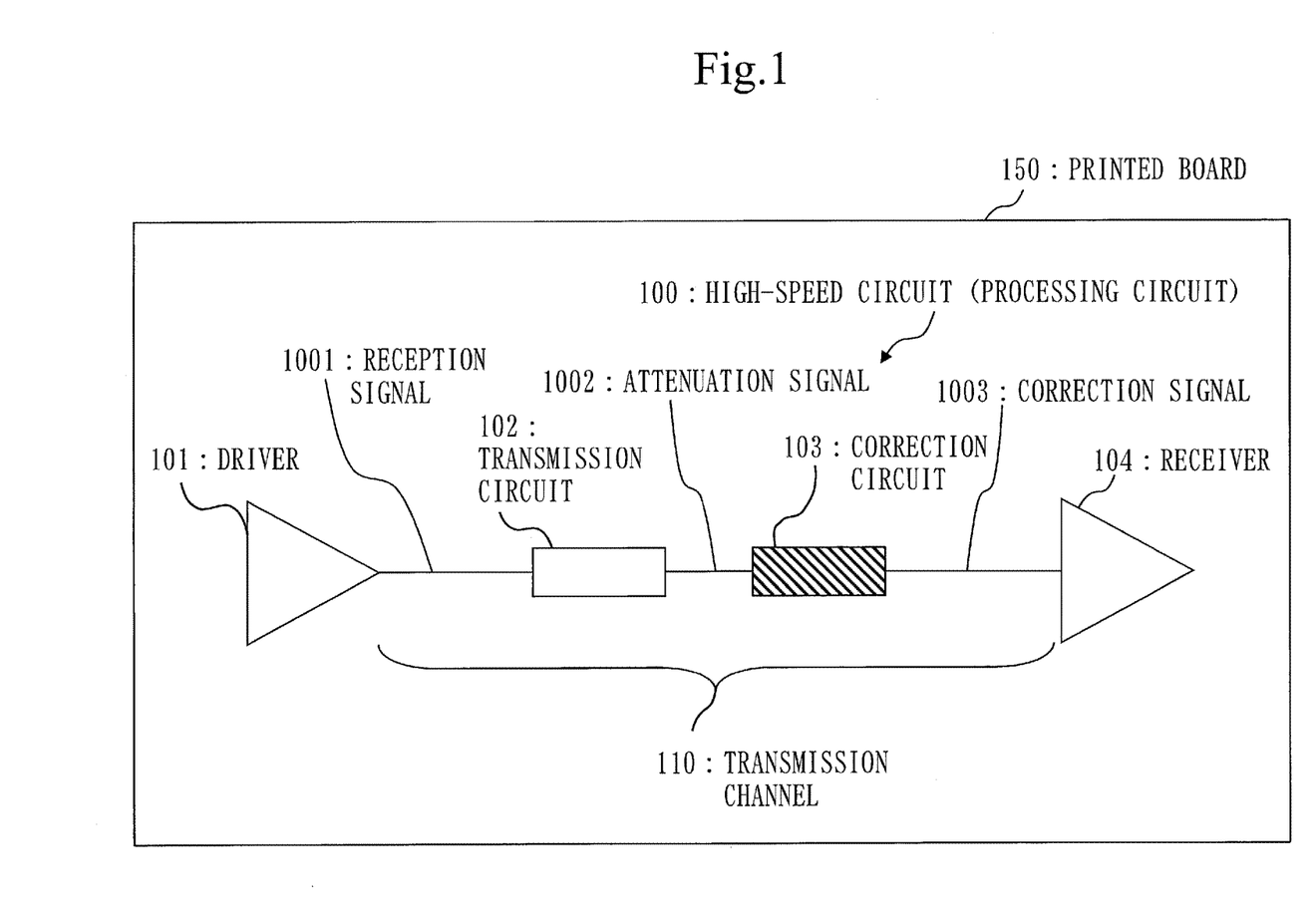
FIG. 1 is a diagram illustrating a high-speed circuit 100 according to Embodiment 1.

FIG. 1 is a diagram illustrating a high-speed circuit 100 according to this embodiment.

The high-speed circuit 100 is a circuit that transmits a high-frequency digital signal at a high speed. The high-speed circuit 100 is an example of a processing circuit mounted on a printed board 150. For example, the printed board 150 may be a plurality of printed boards connected by interboard relay connectors, or a single board. The printed board 150 is also called a printed wiring board.

The high-speed circuit 100 includes a driver 101, a transmission circuit 102, a correction circuit 103, and a receiver 104. The driver 101, the transmission circuit 102, the correction circuit 103, and the receiver 104 are incorporated in, for example, LSIs individually.

The driver 101 is an LSI signal transmission circuit.

The receiver 104 is an LSI signal receiving circuit.

The transmission circuit 102 and correction circuit 103 are constituted of a board pattern disposed to extend from the signal electrode of the driver 101 to the signal electrode of the receiver 104 incorporated in an LSI which opposes an LSI beyond the signal electrode of the driver 101, the interboard relay connectors, and so on.

A transmission channel 110 is a transmission channel extending from the LSI driver 101 on one side to the LSI receiver 104 on the other side. The transmission channel 110 includes the transmission circuit 102 and the correction circuit 103.

The transmission circuit 102 is mounted on the printed board 150, receives a digital signal transmitted from the driver 101, as a reception signal 1001, and sends out the reception signal 1001 as an attenuation signal 1002. The transmission circuit 102 may be an LSI, or a transmission channel constituted of the wiring pattern formed on the printed board 150, the interboard relay connectors, and so on.

The transmission circuit 102 has attenuation characteristics 1021. The transmission circuit 102 attenuates the amplitude of the received reception signal 1001 according to the attenuation characteristics 1021, and sends out the attenuated reception signal 1001 as the attenuation signal 1002.

The correction circuit 103 is mounted on the printed board 150, receives the attenuation signal 1002 transmitted from the transmission circuit 102, and sends out the attenuation signal 1002 as a correction signal 1003. The correction circuit 103 may be an LSI, or a transmission channel constituted of the wiring pattern formed on the printed board 150, the interboard relay connectors, and so on.

The correction circuit 103 is a filter needing no power supply, that implements the inverse characteristics to the loss characteristics of the transmission channel between the LSI driver and the LSI receiver.

The correction circuit 103 has the inverse characteristics to the attenuation characteristics 1021 of the transmission circuit 102. The inverse characteristics of the correction circuit 103 which are inverse to the attenuation characteristics 1021 of the transmission circuit 102 will be referred to as correction characteristics 1031. The correction circuit 103 attenuates the amplitude of the received attenuation signal 1002 according to the correction characteristics 1031, and sends out the attenuated attenuation signal 1002 to the receiver 104, as the correction signal 1003.

Figure 2:
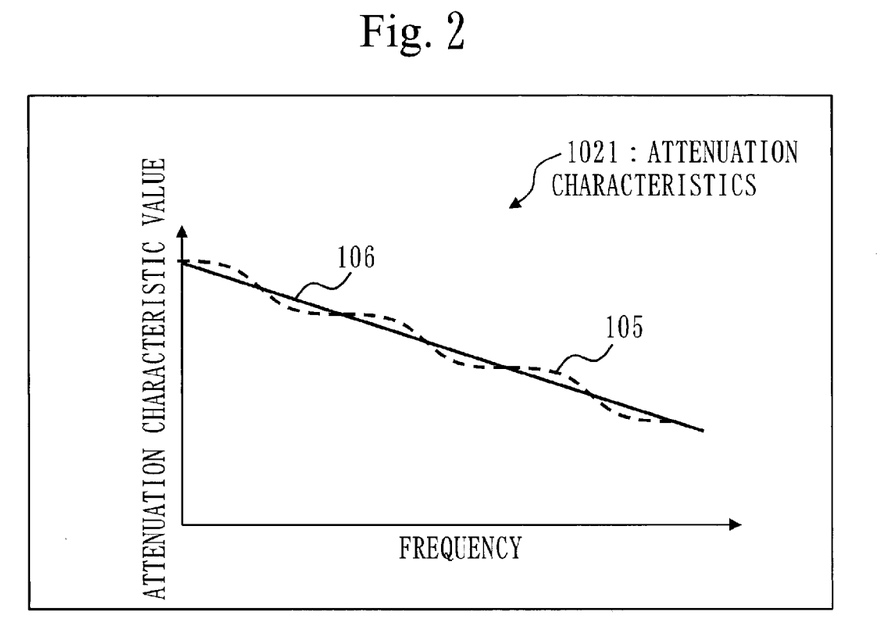
FIG. 2 is a graph representing attenuation characteristics 1021 of a transmission circuit 102 according to Embodiment 1.

FIG. 2 is a graph representing the attenuation characteristics 1021 of the transmission circuit 102 according to this embodiment.

Figure 3:
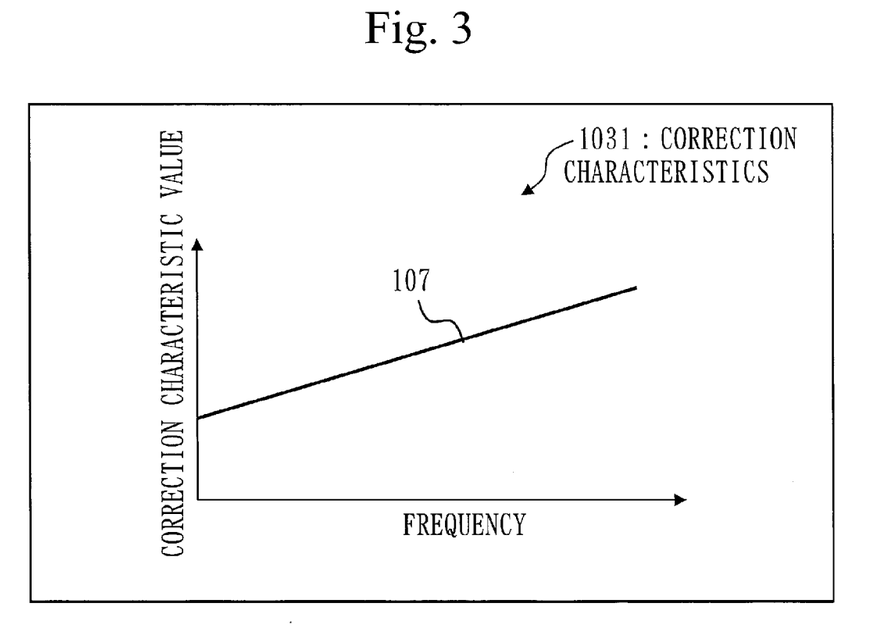
FIG. 3 is a graph representing correction characteristics 1031 of a correction circuit 103 according to Embodiment 1.

FIG. 3 is a graph representing the correction characteristics 1031 of the correction circuit 103 according to this embodiment.

Figure 4:
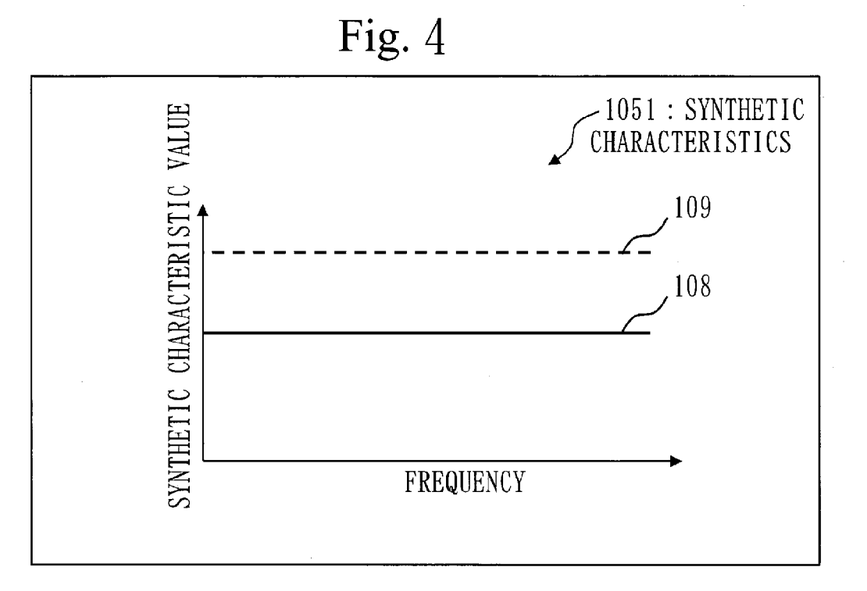
FIG. 4 is a graph representing synthetic characteristics 1051 according to Embodiment 1.

FIG. 4 is a graph representing the synthetic characteristics 1051 according to this embodiment.

The characteristics obtained by synthesizing the attenuation characteristics 1021 and the correction characteristics 1031 will be defined as synthetic characteristics 1051.

As illustrated in FIG. 2, according to the characteristics of the transmission circuit 102, as the frequency of the reception signal 1001 increases, the ratio of the amplitude of the attenuation signal 1002 to the amplitude of the reception signal 1001 decreases. Here the attenuation characteristics 1021 are expressed using the frequency and the ratio (defined as attenuation characteristic value) of the amplitude of the attenuation signal 1002 to the amplitude of the reception signal 1001. Alternatively, the attenuation characteristics 1021 may be expressed using the frequency and the value of the amplitude of the attenuation signal 1002 being the result of attenuation of the reception signal 1001. Alternatively, the attenuation characteristics 1021 may be expressed using the frequency and the attenuation amount.

The attenuation characteristics 1021 are an example of the first attenuation characteristics of the transmission circuit 102.

As illustrated in FIG. 3, according to the characteristics of the correction circuit 103, as the frequency of the received attenuation signal 1002 increases, the ratio of the amplitude of the correction signal 1003 to the amplitude of the attenuation signal 1002 increases.

Here the correction characteristics 1031 are expressed using the frequency and the ratio (defined as correction characteristic value) of the amplitude of thee correction signal 1003 to the amplitude of the attenuation signal 1002. Alternatively, the correction characteristics 1031 may be expressed using the frequency and the value of the amplitude of the correction signal 1003 being the result of attenuation of the attenuation signal 1002. Alternatively, the correction characteristics 1031 may be expressed using the frequency and the attenuation amount.

The correction characteristics 1031 are an example of the second attenuation characteristics of the correction circuit 103.

Referring to FIG. 2, the broken line represents an actual attenuation characteristic value (defined as actual attenuation characteristic value 105). The actual attenuation characteristic value 105 is an example of the first value expressing the relation between the frequency and the ratio of the amplitude of the attenuation signal to the amplitude of the reception signal.

The correction characteristics 1031 of the correction circuit 103 are implemented based on the actual attenuation characteristic value 105 expressing the relation between the frequency and the ratio of the amplitude of the attenuation signal to the amplitude of the reception signal.

At this time, the correction characteristics 1031 are implemented (calculated) based on an interpolation attenuation characteristic value 106 (an example of the second value) obtained by approximating the actual attenuation characteristic value 105 of the reception signal 1001 with respect to the frequency, to a straight line by linear interpolation.

A correction characteristic value 107 being inverse characteristics to the attenuation characteristics 1021 implemented in this manner will be defined as the correction characteristics 1031. The correction characteristics 1031 are implemented by the correction circuit 103, and the correction circuit 103 is disposed on the printed board 150.

When a digital signal (reception signal 1001) transmitted from the driver 101 passes through the transmission circuit 102 having the attenuation characteristics 1021 and the correction circuit 103 having the correction characteristics 1031, the digital signal is sent out as the correction signal 1003 that matches the synthetic characteristics 1051 being the result of synthesis of the attenuation characteristics 1021 and correction characteristics 1031.

As illustrated in FIG. 4, the synthetic characteristics 1051 is expressed by the relation between the frequency and the ratio of the amplitude of the correction signal 1003 to the amplitude of the reception signal 1001. The ratio of the amplitude of the correction signal 1003 to the amplitude of the reception signal 1001 will be defined as a synthetic characteristic value 108.

As illustrated in FIG. 4, the synthetic characteristic value 108 has been smoothed. As with this, the synthetic characteristic value 108 is preferably constant regardless of the frequency. Nevertheless, the synthetic characteristic value 108 need not always be constant regardless of the frequency. If the gradient of the synthetic characteristic value 108 is more moderate than the gradient of the interpolation attenuation characteristic value 106 (see FIG. 2), the effect of the correction circuit 103 can be achieved. More specifically, the change amount of the ratio of the amplitude of the correction signal 1003 to the amplitude of the attenuation signal 1002 can be made smaller than the change amount of the ratio of the amplitude of the attenuation signal 1002 to the amplitude of the reception signal 1001.

With the correction characteristics 1031, the attenuation signal 1002 is attenuated such that the ratio of the amplitude of the correction signal 1003 to the amplitude of the reception signal 1001 becomes constant regardless of the frequency of the attenuation signal 1002. The correction characteristics 1031 are inverse characteristics to the attenuation characteristics 1021.

As described above, the characteristic value of the transmission channel 110 of from the LSI driver 101 on one side to the LSI receiver 104 on the other side has the synthetic characteristic value 108 which is the result of synthesis of the interpolation attenuation characteristic value 106 and the correction characteristic value 107 being the inverse characteristics to the interpolation attenuation characteristic value 106. The synthetic characteristic value 108 is flat as illustrated in FIG. 4. The synthetic characteristic value 108 includes a loss over the entire frequency band. Hence, a predetermined gain may be added to the synthetic characteristic value 108 by the driver 101 or receiver 104, and characteristics 109 may be finally obtained.

More specifically, the receiver 104 amplifies the amplitude of the correction signal 1003 and sends out the amplified correction signal 1003. Alternatively, the driver 101 amplifies the amplitude of the reception signal 1001 in advance, before sending out the reception signal 1001, and sends out the amplified reception signal 1001.

Figure 5:
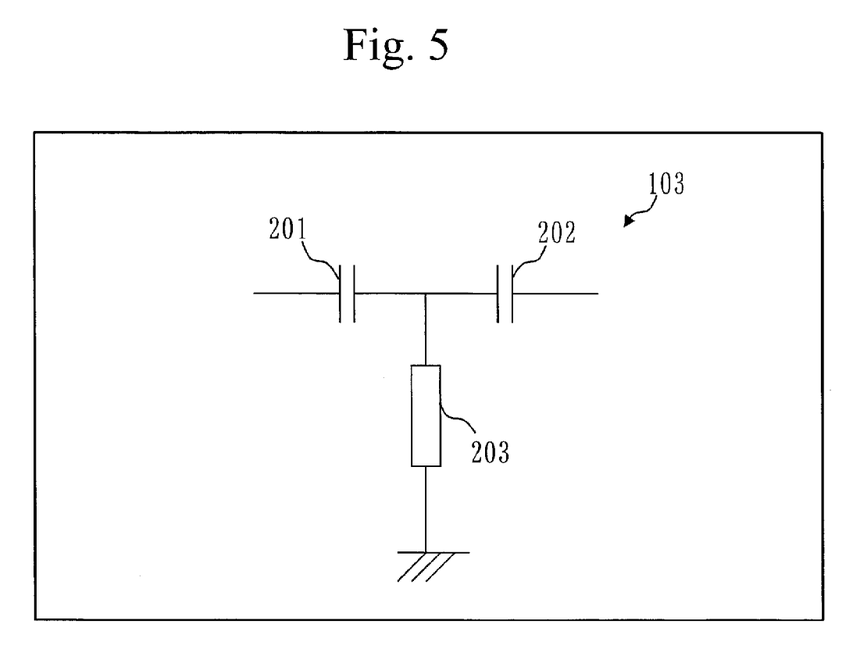
FIG. 5 is a diagram illustrating an example of a circuit configuration of the correction circuit 103 according to Embodiment 1.

The configuration of the correction circuit 103 will now be described.

FIG. 5 is a diagram illustrating an example of a circuit configuration of the correction circuit 103 according to this embodiment.

The correction circuit 103 is, for example, a high-pass filter. The correction characteristics 1031 of the correction circuit 103 are implemented using the characteristics of the high-pass filter.

As illustrated in FIG. 5, the correction circuit 103 is a circuit that implements the correction characteristics 1031 being the inverse characteristics to the attenuation characteristics 1021, by an inductor L and a capacitor C which are passive elements.

The correction circuit 103 is, for example, a Butterworth-type high-pass filter constituted of capacitors 201 and 202 and an inductor 203. Compared to other filter types, the frequency characteristics of the Butterworth-type high-pass filter are linear with no point of inflection in the attenuation range, and have a moderate gradient. Using such frequency characteristics of the Butterworth-type high-pass filter, the inverse characteristics to the attenuation characteristics 1021 can be obtained in the attenuation band of the Butterworth-type high-pass filter. More specifically, the correction characteristic value 107 of the correction circuit 103 having a Butterworth-type high-pass filter has no point of inflection.

Both of the capacitor 201 and the capacitor 202 provide a DC (direct current) shutoff function as well. Usually, the constants of a DC shutoff capacitor are set such that the impedance is the lowest at the center of the signal frequency band. In this embodiment, it is suitable to use values that correspond with the characteristics of the filter.

Figure 6:
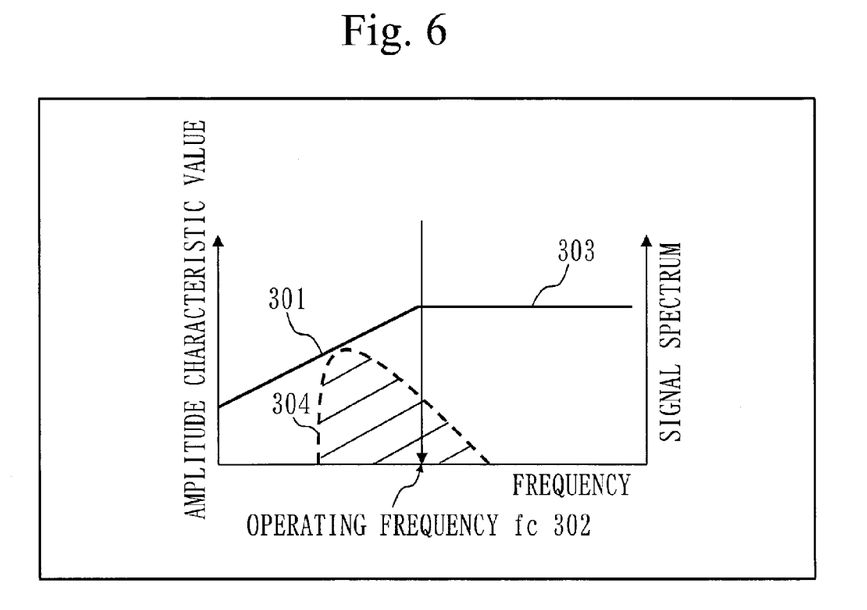
FIG. 6 is a graph for explaining the characteristics relaxation of a Butterworth-type high-pass filter according to Embodiment 1.

An example will be described in which the characteristics of the Butterworth-type high-pass filter are relaxed so that the correction characteristics 1031 of the correction circuit 103 are resulted.

FIG. 6 is a graph for explaining the characteristics relaxation of the Butterworth-type high-pass filter according to this embodiment. FIG. 6 is a graph illustrating the relation among the signal frequency, the signal amplitude characteristics (amplitude characteristic value), and the signal spectrum.

As illustrated in FIG. 6, a portion of from a low-frequency range to an operating frequency fc 302 will be defined as presenting inverse characteristics 301 to the attenuation characteristics 1021. A high-frequency range for the operating frequency fc 302 and over will be defined as a passband 303 where the amplitude does not change.

The broken line in FIG. 6 expresses an existence probability 304 of the signal spectrum. As illustrated in FIG. 6, the existence probability 304 of the signal spectrum of a digital signal is concentrated on a portion of from a frequency that is approximately ¼ the operating frequency fc 302 to the operating frequency fc 302. Therefore, it is preferable to perform correction for a frequency band of from a frequency that is approximately ¼ the operating frequency fc 302 to the operating frequency fc 302.

Figure 7:
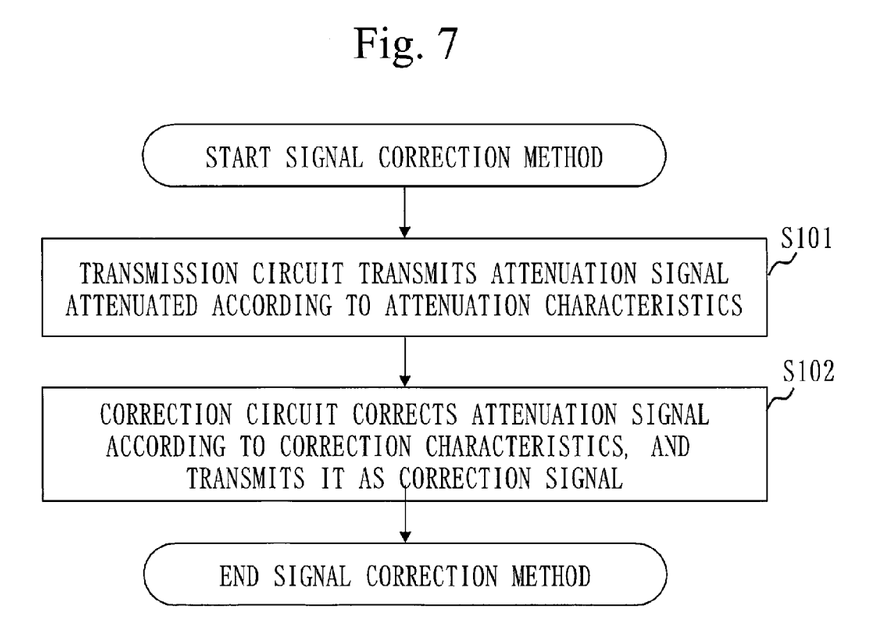
FIG. 7 is a flowchart illustrating a signal correction method (stage) of the high-speed circuit 100 according to Embodiment 1.

A signal correction method (stage) of the high-speed circuit 100 according to this embodiment will be described.

FIG. 7 is a flowchart illustrating the signal correction method (stage) of the high-speed circuit 100 according to Embodiment 1.

In S101, the transmission circuit 102 sends out the attenuation signal 1002 that has been attenuated according to the attenuation characteristics 1021. In S102, the correction circuit 103 corrects the attenuation signal 1002 according to the correction characteristics 1031 and sends out the corrected attenuation signal 1002, as the correction signal 1003.

The high-speed circuit described in this embodiment is a high-speed circuit aimed at transmission of a binary or more digital signal that uses rectangular waves. The high-speed circuit is constituted of a driver incorporated in a semiconductor device such as an LSI, a printed wiring board pattern, and a receiver incorporated in a semiconductor device such as an LSI. In the high-speed circuit, the attenuation characteristics for the transmission channel are interpolated. The correction circuit formed of passive components having inverse characteristics to the interpolated attenuation characteristics is disposed on the printed wiring board.

As described above, with the high-speed circuit according to this embodiment, the following effects can be obtained on behalf of the LSIs. The equalizers of the driver and receiver need not raise the gain in the high-frequency range. Thus, an effect of reducing the circuit difficulty required of an LSI is obtained.

Also, the following effects can be obtained on behalf of the board. Conventionally, the attenuation characteristics of the transmission circuit itself are designed such that flat amplitude characteristics can be obtained throughout the entire passing frequency band of the signal. Accordingly, the board material is selected and board design is practiced such that the passing loss is small in a wide band. However, if the correction circuit according to this embodiment is mounted, flat characteristics can be obtained throughout the entire passing frequency band without making the transmission circuit with special design or the like. This increases the options in selecting the board material, and the effect of relaxing the difficulty in board design can be obtained.

As described above, in the high-speed circuit according to the present invention, a filter that implements the inverse characteristics to the loss characteristics of the transmission channel and requires no power supply is arranged on the transmission channel side of the board, that is, between the LSI driver and the LSI receiver. With this arrangement, the fundamental wave and the high frequency band are flattened in a lump by the LSI receiver. As a result, the LSI is not required to have a high amplitude amount in the high-frequency range, so that the effect of decreasing the crosstalk noise and reducing the circuit size can be obtained.

Embodiment 2

In this embodiment, the differences from Embodiment 1 will mainly be described.

Figure 8:
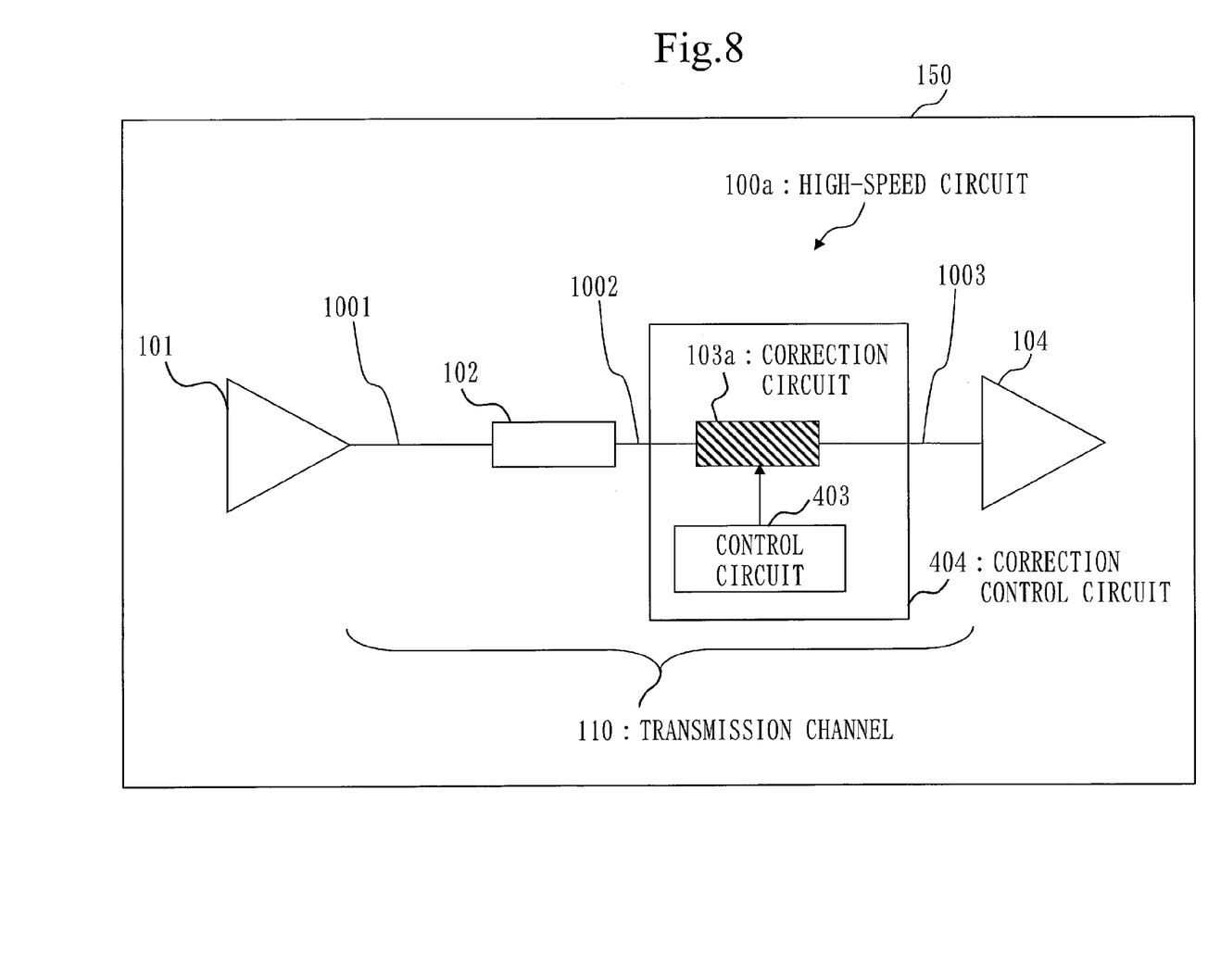
FIG. 8 is a diagram illustrating a high-speed circuit 100a according to Embodiment 2.

In this embodiment, the constituent portions that are the same as their counterparts in Embodiment 1 will be denoted by the same reference numerals, and a detailed description thereof will sometimes be omitted FIG. 8 is a diagram illustrating a high-speed circuit 100a according to this embodiment.

Figure 9:
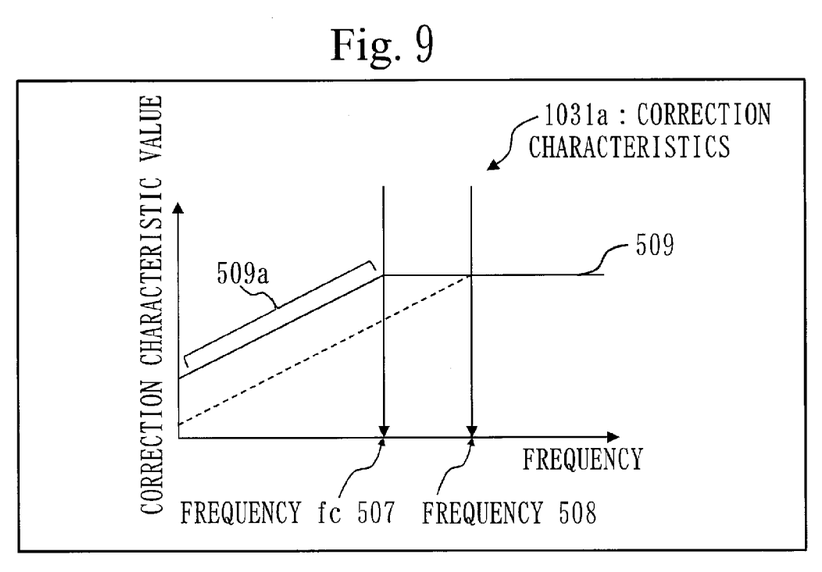
FIG. 9 is a graph representing correction characteristics 1031a of a correction circuit 103a according to Embodiment 2.

FIG. 9 is a graph representing correction characteristics 1031a of a correction circuit 103a according to this embodiment.

The high-speed circuit 100a in FIG. 8 has a circuit configuration for changing the correction characteristics of the correction circuit 103 described in Embodiment 1. FIG. 8 is different from FIG. 1 in that the high-speed circuit 100a includes a control circuit 403 connected to the correction circuit 103a. A circuit that includes the correction circuit 103a and control circuit 403 will be defined as a correction control circuit 404.

FIG. 9 is a graph illustrating the correction characteristics 1031a of the correction circuit 103a. FIG. 9 presents the relation between the frequency of an attenuation signal 1002 and the ratio of the amplitude of a correction signal 1003 to the amplitude of the attenuation signal 1002. The ratio of the amplitude of the correction signal 1003 to the amplitude of the attenuation signal 1002 will be defined as a correction characteristic value 509. As far as a frequency fc 507, the correction characteristic value increases as the frequency increases, and does not change in a band where the frequency is higher than the frequency fc 507.

The control circuit 403 is a circuit that can control the correction characteristics 1031a of the correction circuit 103a.

The control circuit 403 changes the cutoff frequency of the correction characteristic value 509 from the frequency fc 507 to a frequency fc 508. Here, the cutoff frequency, being a maximum value of a frequency within a frequency band where characteristics 509a is exhibited, is the frequency fc 507, the characteristics 509a indicating the correction characteristic value 509 that increases as the frequency of the attenuation signal 1002 increases. The control circuit 403 changes the cutoff frequency from the frequency fc 507 to the frequency fc 508.

Figure 10:
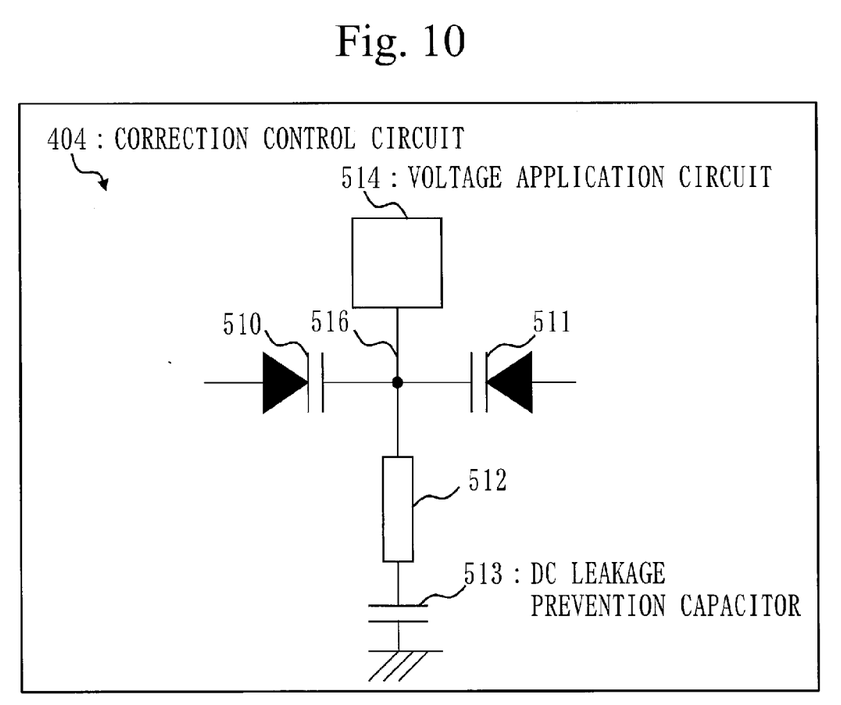
FIG. 10 is a diagram illustrating an example of a circuit configuration of a correction control circuit 404 according to Embodiment 2.

FIG. 10 is a diagram illustrating an example of a circuit configuration of the correction control circuit 404 according to this embodiment.

A specific circuit configuration that implements the correction control circuit 404 will be described with reference to FIG. 10.

The correction control circuit 404 includes a variable capacitance diode 510, a variable capacitance diode 511, a voltage application circuit 514, a node 516, an inductor 512, and a DC leakage prevention capacitor 513.

In the correction control circuit 404, the capacitor 201 and the capacitor 202 of Embodiment 1 are respectively replaced by the variable capacitance diode 510 and the variable capacitance diode 511, both being a static capacitance variable device. The capacitor 201 and the capacitor 202 of Embodiment 1 are equivalent to the variable capacitance diode 510 and the variable capacitance diode 511.

The voltage application circuit 514 is also disposed which changes the static capacitance of the variable capacitance diode 510 and variable capacitance diode 511. The voltage application circuit 514 is connected between the variable capacitance diode 510 and the variable capacitance diode 511 through a node 516.

The DC leakage prevention capacitor 513 is disposed to handle the voltage applied by the voltage application circuit 514.

The inductor 512 is disposed between the voltage application circuit 514 and the DC leakage prevention capacitor 513. The inductor 512 is equivalent to the inductor 203 described in Embodiment 1.

FIG. 10 is a diagram illustrating an example of the circuit configuration of the correction control circuit 404 according to Embodiment 2.

The operation principle of the correction control circuit 404 will be described with reference to FIG. 10.

The correction control circuit 404 changes the static capacitance of the variable capacitance diode 510 and variable capacitance diode 511 by applying a DC potential to the node 516. When the static capacitance of the variable capacitance diode 510 and variable capacitance diode 511 is changed, the cutoff frequency is changed.

At this time, for example, a DAC circuit (digital-to-analog conversion circuit) is used as the voltage application circuit 514. By using the DAC circuit as the voltage application circuit 514, a digitally controllable system can be constructed using LSIs.

Figure 11:
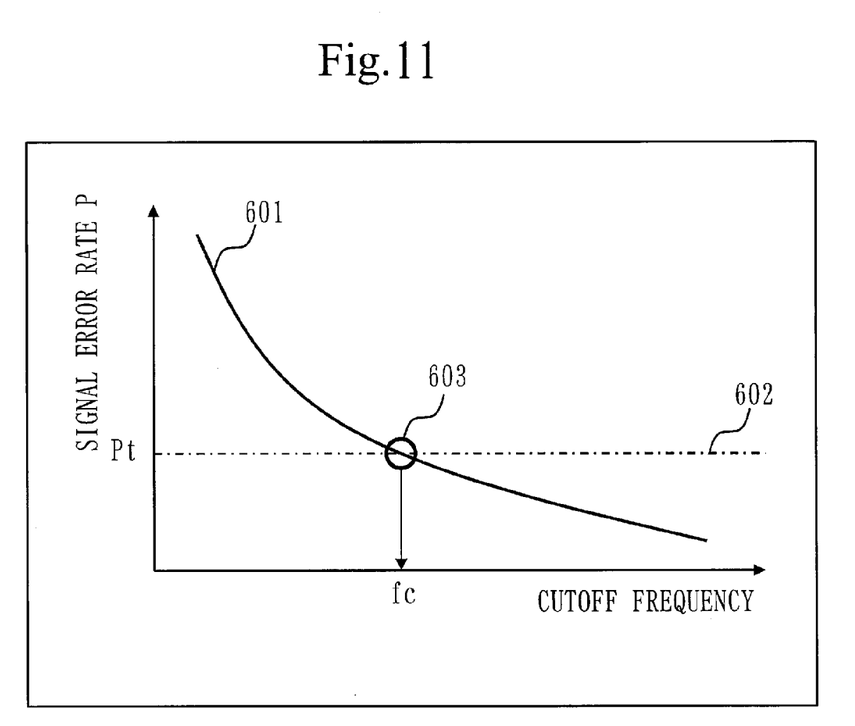
FIG. 11 is a graph for explaining a control method of a control circuit 403 according to Embodiment 2.

A control method of the control circuit 403 will now be described.

FIG. 11 is a graph for explaining a control method of the control circuit 403 according to this embodiment.

FIG. 11 is a schematic graph in which a change in signal error rate P of when the cutoff frequency of the correction circuit 103a is changed, is expressed as characteristics 601.

In the high-speed circuit 100a, a required error rate of when executing high-speed signal transmission is denoted by Pt 602. The control circuit 403 calculates a point 603 where the required error rate Pt 602 can be maintained, from a signal obtained with a receiver 104. The control circuit 403 determines the frequency at the calculated point 603, as an optimum cutoff frequency fc.

A specific system operation procedure (cutoff frequency control method (stage)) of the control circuit 403 will now be described.

After a signal is received by the receiver 104, the LSI provided with the receiver 104 calculates the error rate by a calculation circuit incorporated in the LSI. The LSI acquires the relation between the cutoff frequency fc and the error rate and stores the relation to a memory. The LSI executes this procedure for the cutoff frequency fc in a predetermined range, and stores the relation between the error rate and the cutoff frequency fc, that is, the characteristics 601, to the memory.

Subsequently, the cutoff frequency fc is acquired from the characteristics 601 based on the required error rate Pt 602 being the maximum error rate that satisfies the required error rate Pt 602. A control signal for applying a voltage corresponding to this cutoff frequency is transmitted to the DAC which is the voltage application circuit 514. Then, the DAC applies a control voltage.

As has been described above, the correction control circuit according to this embodiment has the following configuration. A control circuit has an adaptive control function of changing the cutoff frequency depending on the maximum frequency for a frequency band where the correction characteristics have inverse characteristics to the attenuation characteristics. This control circuit is disposed on the printed board.

As described above, the high-speed circuit 100a according to this embodiment provides an effect that optimum transmission channel characteristics can be maintained for an application whose signal transmission rate changes. Namely, a necessary error rate can be guaranteed in the high-speed circuit 100a.

The embodiments of the present invention have been described. Of the above embodiments, two or more may be practiced by combination. Alternatively, of the above embodiments, one may be practiced partially. Alternatively, of the above embodiments, two or more may be practiced by partial combination.

The above embodiments are essentially preferable exemplifications and are not intended to limit the scope of the present invention, the scope of the applied product of the present invention, and the scope of usage of the present invention, and various changes may be made to the above embodiments as needed. The present invention is not limited to these embodiments and various changes may be made to the present invention as needed.

REFERENCE SIGNS LIST 100, 100a: high-speed circuit; 101: driver; 102: transmission circuit; 103, 103a: correction circuit; 104: receiver; 110: transmission channel; 150: printed board; 201, 202: capacitor; 203: inductor; 301: inverse characteristics; 302: operating frequency fc; 303: passband; 304: existence probability; 403: control circuit; 404: correction control circuit; 509: correction characteristic value; 509a: characteristics; 510, 511: variable capacitance diode; 512: inductor; 513: DC leakage prevention capacitor; 514: voltage application circuit; 516: node; 601: characteristics; 602: required error rate; 603: point; 1001: reception signal; 1002: attenuation signal; 1003: correction signal; 1021: attenuation characteristics; 1031: correction characteristics; 1051: synthetic characteristics

The invention claimed is:

1. A processing circuit mounted on a printed board, comprising:
a transmission circuit, mounted on the printed board and having first attenuation characteristics of attenuating an amplitude of a reception signal that has been received, to send out the reception signal that has been attenuated according to the first attenuation characteristics, as an attenuation signal; and
a correction circuit, mounted on the printed board and having second attenuation characteristics of attenuating the attenuation signal that has been received from the transmission circuit, to transmit the attenuation signal that has been attenuated according to the second attenuation characteristics, as a correction signal,
the first attenuation characteristics of the transmission circuit being characteristics with which a ratio of an amplitude of the attenuation signal to an amplitude of the reception signal decreases as a frequency of the reception signal increases,
the second attenuation characteristics of the correction circuit being characteristics with which a ratio of an amplitude of the correction signal to an amplitude of the attenuation signal increases as a frequency of the attenuation signal increases, and
wherein the ratio of the amplitude of the correction signal to the amplitude of the attenuation signal has a change amount that is smaller than a change amount of the ratio of the amplitude of the attenuation signal to the amplitude of the reception signal.

2. The processing circuit according to claim 1, wherein the second attenuation characteristics of the correction signal are inverse characteristics to the first attenuation characteristics, with which inverse characteristics the attenuation signal is attenuated such that the ratio of the amplitude of the correction signal to the amplitude of the reception signal is constant regardless of the frequency of the attenuation signal.

3. The processing circuit according to claim 1, wherein the correction circuit attenuates the attenuation signal based on a first value that expresses a relation between the frequency of the reception signal and the ratio of the amplitude of the attenuation signal to the amplitude of the reception signal.

4. The processing circuit according to claim 3, wherein the second attenuation characteristics of the correction circuit are calculated based on a second value being a result of approximation of the first value to a straight line.

5. The processing circuit according to claim 1, wherein the correction circuit has a high-pass filter.

6. The processing circuit according to claim 1, wherein the correction circuit is constituted of a capacitor and an inductor.

7. The processing circuit according to claim 1, wherein the correction circuit has a Butterworth-type high-pass filter.

8. The processing circuit according to claim 1, comprising a control circuit that changes a cutoff frequency, being a maximum value of a frequency within a frequency band where, according to the second attenuation characteristics, the ratio of the amplitude of the correction signal to the amplitude of the attenuation signal increases as the frequency of the attenuation signal increases.

9. The processing circuit according to claim 1, comprising:
- a driver, mounted on the printed board, to send out the reception signal to the transmission circuit; and
- a receiver, mounted on the printed board, to receive the correction signal from the correction circuit.

10. The processing circuit according to claim 9, wherein the receiver amplifies the amplitude of the correction signal and sends out the amplified correction signal.

11. The processing circuit according to claim 9, wherein the driver amplifies the amplitude of the reception signal before sending out the reception signal, and sends out the amplified reception signal.

12. A signal correction method of a processing circuit mounted on a printed board, the signal correction method comprising:
- by a transmission circuit, mounted on the printed board, to transmit a reception signal that has been received, as an attenuation signal, transmitting the reception signal that has been attenuated, as the attenuation signal, the reception signal having been attenuated according to first attenuation characteristics with which a ratio of an amplitude of the attenuation signal to an amplitude of the reception signal decreases as a frequency of the reception signal increases; and
- by a correction circuit, mounted on the printed board, to transmit the attenuation signal that has been received from the transmission signal, as a correction signal, transmitting the attenuation signal that has been attenuated, as the correction signal, the attenuation signal having been attenuated according to second attenuation characteristics with which a ratio of an amplitude of the correction signal to the amplitude of the attenuation signal increases as a frequency of the attenuation signal increases, wherein the ratio of the amplitude of the correction signal to the amplitude of the attenuation signal has a change amount that is smaller than a change amount of the ratio of the amplitude of the attenuation signal to the amplitude of the reception signal.

13. A processing circuit mounted on a printed board, comprising:
- a transmission circuit, mounted on the printed board and having first attenuation characteristics of attenuating an amplitude of a reception signal that has been received, to send out the reception signal that has been attenuated according to the first attenuation characteristics, as an attenuation signal; and
- a correction circuit, mounted on the printed board and having second attenuation characteristics of attenuating the attenuation signal that has been received from the transmission circuit, to transmit the attenuation signal that has been attenuated according to the second attenuation characteristics, as a correction signal,
- the first attenuation characteristics of the transmission circuit being characteristics with which a ratio of an amplitude of the attenuation signal to an amplitude of the reception signal decreases as a frequency of the reception signal increases,
- the second attenuation characteristics of the correction circuit being characteristics with which a ratio of an amplitude of the correction signal to an amplitude of the attenuation signal increases as a frequency of the attenuation signal increases, and
- wherein the correction circuit attenuates the attenuation signal based on a first value that expresses a relation between the frequency of the reception signal and the ratio of the amplitude of the attenuation signal to the amplitude of the reception signal.

14. The processing circuit according to claim 13, wherein the second attenuation characteristics of the correction circuit are calculated based on a second value being a result of approximation of the first value to a straight line.

15. A processing circuit mounted on a printed board, comprising:
- a transmission circuit, mounted on the printed board and having first attenuation characteristics of attenuating an amplitude of a reception signal that has been received, to send out the reception signal that has been attenuated according to the first attenuation characteristics, as an attenuation signal;
- a correction circuit, mounted on the printed board and having second attenuation characteristics of attenuating the attenuation signal that has been received from the transmission circuit, to transmit the attenuation signal that has been attenuated according to the second attenuation characteristics, as a correction signal,
- the first attenuation characteristics of the transmission circuit being characteristics with which a ratio of an amplitude of the attenuation signal to an amplitude of the reception signal decreases as a frequency of the reception signal increases,
- the second attenuation characteristics of the correction circuit being characteristics with which a ratio of an amplitude of the correction signal to an amplitude of the attenuation signal increases as a frequency of the attenuation signal increases; and
- a control circuit that changes a cutoff frequency, being a maximum value of a frequency within a frequency band where, according to the second attenuation characteristics, the ratio of the amplitude of the correction signal to the amplitude of the attenuation signal increases as the frequency of the attenuation signal increases.

* * * * *